United States Patent [19]

Ambrosini et al.

[11] 4,101,631

[45] Jul. 18, 1978

[54] SELECTIVE ADSORPTION OF MERCURY FROM GAS STREAMS

[75] Inventors: Ronald Frank Ambrosini, Scarsdale; Richard Alan Anderson, Katonah, both of N.Y.; Louis Leonard Fornoff, Cedar Grove, N.J.; Krishan Dayal Manchanda, Yorktown Heights, N.Y.

[73] Assignee: Union Carbide Corporation, New York, N.Y.

[21] Appl. No.: 738,529

[22] Filed: Nov. 3, 1976

[51] Int. Cl.² .................................................. B01D 53/34
[52] U.S. Cl. ........................................... 423/210; 55/72; 55/75
[58] Field of Search ....................... 423/210; 55/72, 75

[56] References Cited

U.S. PATENT DOCUMENTS 3,876,393   4/1975   Kasai et al. ............................ 55/72

OTHER PUBLICATIONS

Barrer et al., "Mercury Uptake in Various Cationic Forms of Several Zeolites", Journal of the Chemical Society, Feb. 1967, pp. 19–25.
Steijns et al., "Mercury Chemisorption by Sulfur Absorbed in Porous Materials", Journal of Colloid & Interface Science, New York, vol. 27, No. 1, Oct. 1976, pp. 181–186.

Primary Examiner—Earl C. Thomas
Attorney, Agent, or Firm—Richard G. Miller

[57] ABSTRACT

Mercury vapor is selectively chemisorbed from gas streams by contact with zeolitic molecular sieves containing elemental sulfur. The selectivity and capacity of the zeolite adsorbent in the process is not affected adversely by the presence of adsorbed water vapor or water vapor in the gas stream being treated.

8 Claims, 1 Drawing Figure

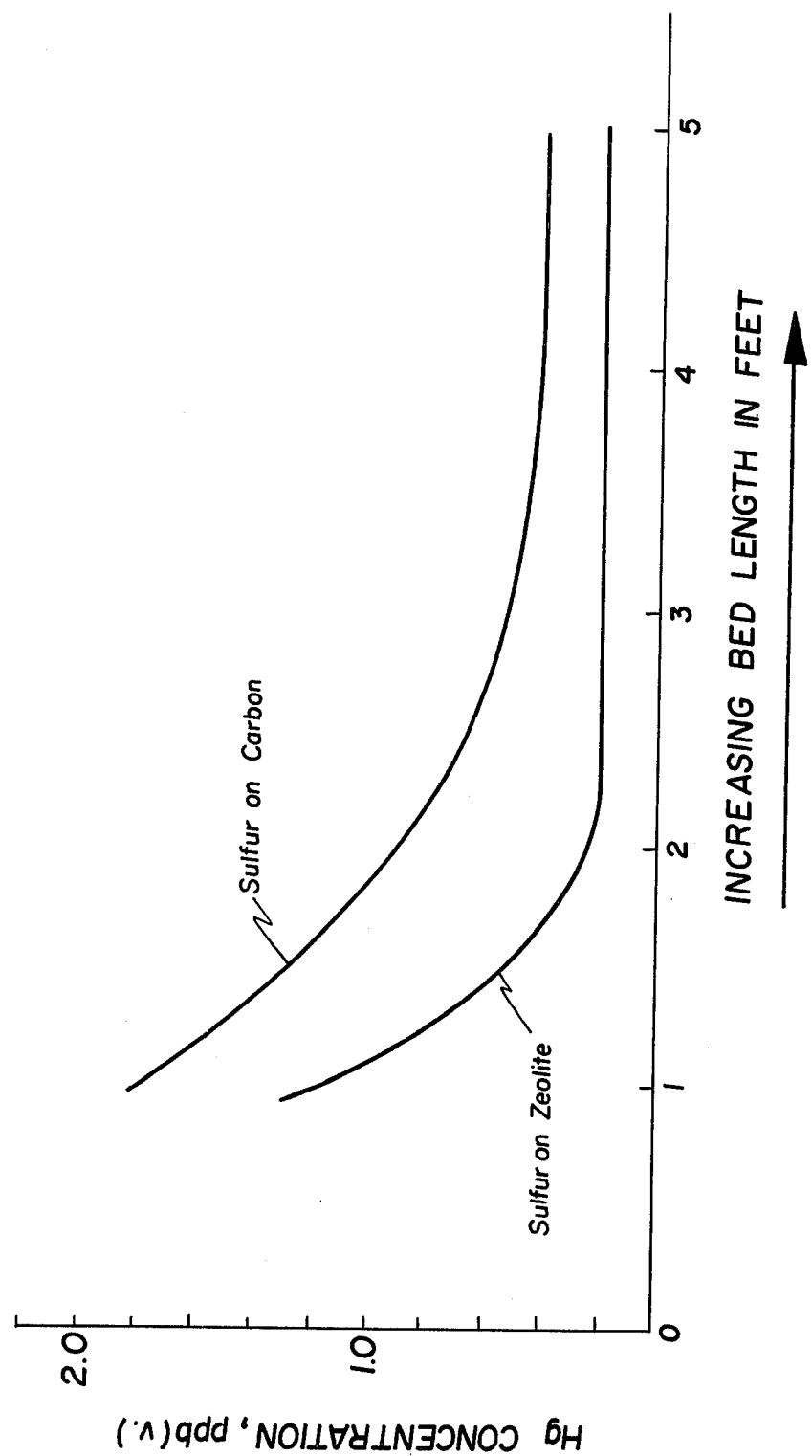

SELECTIVE ADSORPTION OF MERCURY FROM GAS STREAMS

The present invention relates in general to the removal of mercury vapor from gas streams, and more particularly to the treatment of natural gas streams to remove the mercury vapor there from by selective adsorption using a sulfur loaded zeolitic molecular sieve.

It has recently been determined that all natural gas streams contain concentrations of mercury, at least a very large proportion of which is elemental mercury vapor. It is assumed that some organic mercury compounds are also present, but presently available analytical procedures cannot confirm this assumption entirely. Although all natural gas streams contain mercury, the concentration of this impurity is found to vary substantially, and to range from about 0.005 to as high as about 200 micrograms per normal cubic meter ($\mu g/nm^3$). In terms of concentration by volume, this range corresponds to $5.5 \times 10^{-4}$ to 22 parts per billion. Concentrations greater than about 0.50 $\mu g/nm^3$ are considered to be undesirable, particularly in those instances where the natural gas is liquified by cryogenic processing. Highly efficient mercury removal is essential to protect the expensive cryogenic processing equipment.

A number of chemical and physical techniques have heretofore been proposed to remove mercury vapor from gas streams. Generally these procedures are effective only where relatively large concentrations of mercury vapor are present, for example in the treatment of mercury cell hydrogen produced as a by-product in the production of chlorine by the electrolysis of sodium chloride. Suitable processes for those cases involve adsorption and oxidation of elemental mercury in aqueous oxidizing solutions such as acidic permanganate or sodium hypochlorite. Also both physical adsorption and chemisorption have been proposed as techniques to remove mercury vapor. Sorbents for this purpose include silver-impregnated substrates such as alumina, silver cation forms of crystalline zeolites, activated carbons, either alone or impregnated with potassium iodide or sulfur. Whereas some measure of success is achieved using most of these sorbents, all exhibit inadequacies in some respect. The crystalline zeolites, for example, appear to function primarily on the basis of physical adsorption of the elemental mercury and are accordingly adversely affected by adsorbed water vapor. Activated carbon adsorbents do not exhibit a very strong adsorptive affinity for mercury and consequently mass transfer efficiency is strongly dependent on the particle size distribution and configuration of the adsorbent particles.

It is therefore the general object of the present invention to provide a process for selectively sorbing mercury vapor from gas streams, particulary natural gas streams which contain from at least 0.02 preferably at least 2, $\mu g/nm^3$ mercury vapor up to and including saturation values.

This general object and others which will be apparent from the specification hereinafter are accomplished by the process which comprises providing a gas stream containing at least 0.02 micrograms of elemental mercury vapor per normal cubic meter, passing said gas stream at a temperature of from $-40°$ to $100°$ C. through a sorption zone containing a crystalline zeolitic molecular sieve having elemental sulfur loaded thereon in an amount of at least 0.5 weight percent, based on the anhydrous weight of the molecular sieve, whereby mercury is sorbed from said gas stream, and recovering the effluent mercury-depleted gas stream from said adsorption zone.

Although the gas stream treated in accordance with the present invention is preferably a natural gas stream, other gas streams suitably treated can arise from a number of industrial sources. One source is the mercury-containing by-product hydrogen stream from a choralkali plant. Another source derived from mercury cell chlorine processes is the end box seal air. Mercury is also frequently present in ore furnace stack gases, the vent streams from laboratory glassware calibrating stations, and the vent gases from battery disposal or incineration operations. Removal of mercury from these latter types of gas streams is also feasible using the present invention. To maintain the sorptive capacity of the sorbent beds, of course, gas stream constituents which are readily reactive with sulfur or destructive of the zeolite structure should be avoided. By far the most commonly treated gas streams in accordance with this invention comprise mercury vapor and one or more of water vapor, hydrocarbons, particularly methane, hydrogen, nitrogen, air, carbon monoxide and carbon dioxide.

As used herein and in the claims, the term "normal cubic meter" means the quantity of feedstock gas contained in a cubic meter at one atmosphere pressure and at a temperature of $0°$ C.

The sole FIGURE is a graph showing the mercury concentration of the gas stream at various points.

The zeolite molecular sieve component of the sorbent mass employed herein can be any of the natural or synthetic three dimensional crystalline zeolitic aluminosilicates well known in the art. Preferably, however, the molecular sieve has apparent pore diameter greater than about 3 Angstroms and, has a $SiO_2/Al_2O_3$ molar ratio of at least 1.8, preferably from 2 to 20. Although, as would be expected, the variations in zeolite crystal morphology and variations in the make-up of the cation population of the zeolites are factors which cause different zeolites to exhibit different capacities and rates for mercury sorption, the class of crytalline zeolites in its entirety is suitably employed. A particularly effective sub-class of zeolites, however, are those having the faujasite - type of structure, namely zeolite X and zeolite Y; in which the cations electrovalently balancing the net negative charge on the $AlO_4$ - tetrahedra of the structure principally are monovalent and/or divalent metal cations such as $Na^+$, $K^+$, $Li^+$, $Ca^{++}$, $Ba^{++}$, $Mg^{++}$ and $Sr^{++}$.

The loading of sulfur is not a narrowly critical factor but in general a weight loading of from about 0.5 to 10 weight - % based on the anhydrous weight of the zeolite is adequate. Amounts greater than about 6 wt. % do not appear in general to impart much in the way of improved capacity for mercury than the 6 wt.-% level. The anhydrous state of the zeolite is arbitrarily chosen as the weight of the zeolite after calcination at $1000°$ C for 1 hour in air.

It is surprisingly found that the zeolite need not be activated by dehydration either prior to the loading of elemental sulfur or in use during the mercury sorption process. This is in marked contrast to processes utilizing activated carbon, either alone or with a sulfur loading.

Any of a number of chemical and physical methods can be used to load the zeolite with sulfur. In one method sulfur is dissolved in carbon disulfide and contacted with the zeolite, preferably in an activated state, followed by evaporation of the carbon disulfide. In another method H$_2$S can be adsorbed by the zeolite and contacted with an oxygen-containing gas to react with the H$_2$S and produce elemental sulfur and water. The preferred technique comprises internately ad mixing and blending the zeolite, either in powder or agglomerated form with elemental sulfur. It is found that tumbling zeolite agglomerates mixed with sulfur powder in a solids blender, preferably in the presence of atmosphere containing up to 21% oxygen is quite satisfactory as a preparative procedure.

The process of the present invention is illustrated by the following examples:

EXAMPLE 1

Cylindrical pellets of activated sodium zeolite X (1/16 inch diameter) were tumbled in a contact blender with sublimed sulfur to obtain a 6 weight percent sulfur loading. A four pound sample of these pellets was placed in a pipe column adsorbent bed 10 feet long and 1¼ inches in diameter. A natural gas feedstock containing 111 parts per billion (volume) mercury vapor and saturated with water vapor at 90° F was passed horizontally through the adsorbent bed at a temperature of 150° F, a pressure of 800 psig and at a flow rate of 1,270 standard cubic feet per hour. After a period of 288 hours samples of the gas stream in the bed at 1 foot intervals were analyzed for mercury content. Also at various positions along the bed samples of the adsorbent were analyzed for the sorbed mercury contained. The results are shown in Tables 1.

TABLE I

| | Distance from Ingress End into Bed, ft. | | | | | | | |
|---|---|---|---|---|---|---|---|---|
| | <0.001 | 1 | 2 | 2.4 | 3 | 4 | 5 | 7 | 10 |
| Hg Concentration in Gas Stream, ppb. | | 6.0 | 1.0 | — | 0.9 | 0.8 | 0.7 | 0.4 | 0.4 |
| Hg Loading on Bed Section at Position Indicated % Adsorbent Capacity at Feed Equilibrium | | 100 | 25 | — | 0.9 | 0.4 | 0.3 | — | 0.1 | 0.005 |

EXAMPLE 2

In order to compare the effectiveness of a sulfur-loaded zeolite adsorbent with a sulfur loaded activated carbon adsorbent, samples of each were packed into cylindrical adsorbent beds 5 feet long and 1 inch in diameter. The zeolite-based adsorbent was sodium zeolite X having a sulfur loading of 5.2 weight-%. The activated carbon-based sample was obtained commercially and contained about 13 weight-% sulfur. The bulk density of the zeolite adsorbent mass was 42.9 lb/ft$^3$ and the bulk density of the carbon adsorbent mass was 30.1 lb/ft$^3$. A synthesized feedstock consisting of nitrogen saturated with water vapor at 135° F and containing approximately 2000 parts per billion mercury vapor was passed through each bed at 150° F, a pressure of 1 atmosphere and at the rate of 25 to 30 standard cubic feet per hour (superficial linear velocity 80–100 feet per minute). After about 170 hours samples of the gas stream passing through the beds were withdrawn through taps placed at each 1 foot interval of the beds. The mercury concentration of the gas stream at the various points is shown graphically in the drawing. The sulfur-loaded zeolite adsorbent is clearly demonstrated to be superior in performance over the sulfur-loaded carbon adsorbent, both in terms of comparative effluent mercury concentration levels (0.18 ppb/v versus 0.44 ppb/v) and in the length of the mercury mass transfer zones produced in the beds.

What is claimed is:

1. Process for removing mercury vapor from gas streams which comprises providing a gas stream containing water vapor and at least 0.02 micrograms of mercury vapor per normal cubic meter, passing said gas stream at a temperature of from −40° to 100° C. through a sorption zone containing a crystalline zeolitic molecular sieve having a SiO$_2$/Al$_2$O$_3$ molar ratio of from 2 to 20, and having elemental sulfur loaded thereon in an amount of at least 0.5 weight percent, based on the anhydrous weight of the molecular sieve, whereby mercury is adsorbed from said gas stream, and recovering the mercury-depleted effluent gas stream from said sorption zone.

2. Process according to claim 1 wherein the gas stream is natural gas.

3. Process according to claim 1 wherein the gas stream contains at least 2 micrograms of mercury vapor per normal cubic meter.

4. Process according to claim 3 wherein the crystalline zeolite contains in addition to the sulfur loading at least 2 weight percent adsorbed water.

5. Process according to claim 3 wherein the crytalline zeolitic molecular sieve has a faujasite type crystal structure.

6. Process according to claim 5 wherein the molecular sieve is zeolite X.

7. Process according to claim 5 wherein the molecular sieve is zeolite Y.

8. Process according to claim 5 wherein the cations electrovalently balancing the net negative charge on the AlO$_4$-tetrahedra of the zeolite structure consist essentially of one or a mixture of at least two of cations selected from the group consisting of Na$^+$, K$^+$, Li$^+$, Ca$^{++}$, Ba$^{++}$, Mg$^{++}$ and Sr$^{++}$.

* * * * *